Dec. 19, 1961   D. C. BOND ET AL   3,013,607
SELECTIVE PLUGGING BETWEEN CONTIGUOUS STRATA
Filed Sept. 30, 1957   2 Sheets-Sheet 2

INVENTORS
DONALD C. BOND
BY LEO J. O'BRIEN

ATTORNEY

United States Patent Office
3,013,607
Patented Dec. 19, 1961

3,013,607
SELECTIVE PLUGGING BETWEEN
CONTIGUOUS STRATA
Donald C. Bond and Leo J. O'Brien, Crystal Lake, Ill.,
assignors to The Pure Oil Company, Chicago, Ill., a
corporation of Ohio
Filed Sept. 30, 1957, Ser. No. 687,002
10 Claims. (Cl. 166—10)

This invention is concerned with the secondary recovery of petroleum oil from partially depleted, subterranean oil-bearing reservoirs. It is more specifically concerned with increasing the recovery efficiency of petroleum oil from oil-bearing formations having adjacent zones, each of which have a substantially uniform permeability but which vary in permeability relative to each other.

According to this invention, vertical communication between contiguous zones, each of which have a substantially uniform permeability but which vary in permeability relative to each other, is substantially decreased by injecting into one of the contiguous zones a first solution which will interact with a second solution introduced into the other stratum to form a precipitate. By employing this manipulative technique, there is formed at the interface between the respective zones a narrow band of a precipitate which functions as a barrier to substantially decrease the fluid communication between the respective zones.

Subterranean fluids such as petroleum oil, gas and/or water are generally found in petroleum reservoirs or formations which are sedimentary beds or strata sufficiently homogeneous to be regarded as a unit. These fluids can be found distributed throughout the formation or only in intervals or zones of the formation. Although a formation can be substantially uniform in permeability and composition, formations do occur which vary transversely in actual permeability due to the presence of random zones which vary respectively in permeability each to the other. For example, one zone will have a low permeability, viz. 50 millidarcies, while the adjacent zone has a high permeability, viz. 500 millidarcies. (Vide Oil & Gas Journal, May 13, 1957, at p. 98 et seq.) In recovering residual oil from partially depleted zones which are contiguous and have a variable permeability of this nature, a number of problems can occur. In flooding oil-bearing zones by means of a flood water, the injected water will tend to channel through the more permeable streak leaving otherwise normally recoverable oil behind in the tight sand, or less permeable zone.

In addition to formations wherein contiguous zones vary in actual permeabilities, each to the other, petroleum is produced from reservoirs having vertical sections which are substantially uniform throughout in actual permeability but which have adjacent zones varying in the resistance offered, relative to each other, to the flow of fluids therethrough. Reservoirs which have these characteristics are those in which a gas zone, either because of the existence of a gas cap or because of extensive gravity drainage, is present above the oil zone from which the oil is to be recovered (see U.S. Patent 2,385,298). It is important in fields where gas zones exist that the two zones be isolated from one another in order to prevent channeling of the drive fluid, in the form of water either naturally present or artificially produced, through the gas zone which leaves the oil zone substantially unflooded.

To facilitate a further discussion of this invention, formations having the types of variable permeability discussed above will hereinafter be referred to as formations having contiguous zones each of which has a substantially uniform permeability but which vary in permeability relative to each other.

In the recovery of oil from formations having variable permeability characteristics, as above discussed, to prevent the channeling of the drive fluid through the more permeable zone or zones of least resistance thereby leaving the less permeable zone unflooded, conventional packers or surface plugs have been used. These, however, were ineffective because the injected drive fluid, in the case of secondary recovery operations, channels behind them. Another approach to this problem has been to employ solid plugs which fill the interstitial passageways in the rock around the well in the more permeable zones. To effect this requires a large amount of sealing material, the placing of which cannot always be effectively carried out. In addition, any residual oil which is retained within the more permeable zone becomes unrecoverable. It is, therefore, an object of this invention to increase the efficiency of oil recovery from formations having contiguous zones each of which has a substantially uniform permeability but which vary in permeability relative to each other. It is another object of this invention to form a substantially impermeable barrier between the adjacent zones of formations having contiguous zones, each of which has a substantially uniform permeability but which vary in permeability relative to each other. An additional object of this invention is to minimize the vertical communication of a drive fluid employed in a secondary recovery process between contiguous oil-bearing zones. These and other objects will become more apparent from the following detailed description of this invention.

Figure 1:
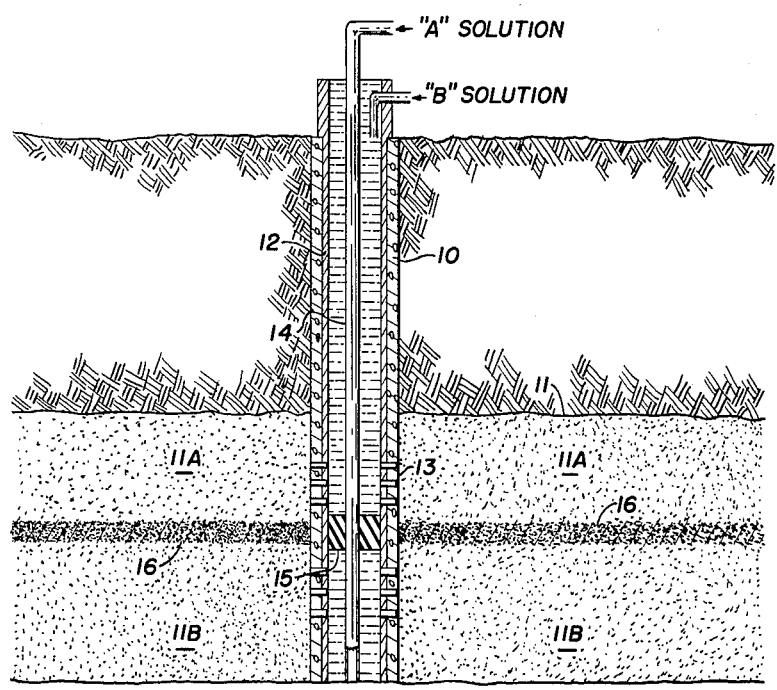
FIGURE 1 illustrates a typical geological formation representative of a petroleum reservoir in which the oil is contained in a plurality of zones of differing permeabilities within the formation, and an exemplary arrangement of equipment within the wellbore for carrying out the process of this invention.

According to this invention, it has been found that a barrier for preventing vertical communication between contiguous zones varying in permeability each to the other can be produced by injecting separate incompatible solutions into each zone. These fluid substances are adapted to react together to form a precipitate when they come in contact with each other. It has been found that the injected solutions, because of the mechanics of displacement and the porous nature of the reservoir, will not mix to form a precipitate which will extend throughout the vertical plane of the respective zones being treated. Instead, the two injected fluids will follow separate paths through the zone into which each fluid was introduced, contacting each other only at the interface between the contiguous zones. At this interface the two fluid substances will meet and react to form a precipitate resulting in the formation of a barrier which will substantially reduce the vertical communication between the contiguous reservoirs and thereby avoid channelling of an injected drive fluid employed in a secondary recovery operation through the less permeable zone.

In carrying out the process of this invention gaseous or liquid vehicles can be employed to contain the selected substances which are adapted to react together to form a precipitate, or function, per se, as precipitants.

In an illustrative embodiment of this invention, synthetic stratified cores were made by casting two layers of sand which differed in grain size, using an adhesive to consolidate the sands. Satisfactory synthetic cores were made by using "Scotchcast" adhesive, a proprietary composition marketed by the Minnesota Mining and Mfg. Co. The cores were then cured at 130° F. for 4 to 8 hours. The outer surface of the core was made impermeable by coating the core shape with Armstrong's "A" adhesive, a proprietary composition marketed by Armstrong Cork Company. In manufacturing the cores, a short length of glass tubing was inserted into each layer of the core and cemented in place. Solutions entered the core through these tubes and exited either through an open-end face, or through similar pieces of tubing at the opposite end of the core. The procedure followed in flooding these cores consisted of passing one of the solutions through the more permeable zones until it showed in the effluent, then the second solution was started through the tight zone. Both solutions were continued through the core until 3–5 pore volumes of each material had passed through.

In one investigation a Berea core was mounted in a conventional permeameter modified to permit the separate introduction of precipitate-forming solutions. A solution containing 4.5 parts of ferrous iron (as ferrous sulfate) per 100 parts of water was introduced into one zone. Into the other zone an aqueous solution containing 2.6 parts sulfur (as hydrogen sulfide) per 100 parts of water was introduced. Vertical plug sections for permeability determinations were taken and it was found that the permeability was reduced from 53 millidarcies to 3.5 millidarcies after about one pore volume of each solution had passed through the core.

Prior to the initial illustrative embodiment, water was injected into the more permeable zone under a constant head of 14 inches of water. Water passing through the core was collected separately from each zone of the core, and measured 415 cc. from the more permeable zone and 135 cc. from the less permeable zone. After passing a solution of ferrous sulfate through the loose zone, and water saturated with hydrogen sulfide through the tight zone, distilled water under a head of 14 inches of water was again injected into the loose zone. Due to the precipitate formed in the core, the effluent collected at the outlet of the tight zone was only 90 cc., while the effluent collected from the loose zone was again 415 cc. This evidence indicated a reduction of about one-third in the vertical permeability between zones.

Figure 2:
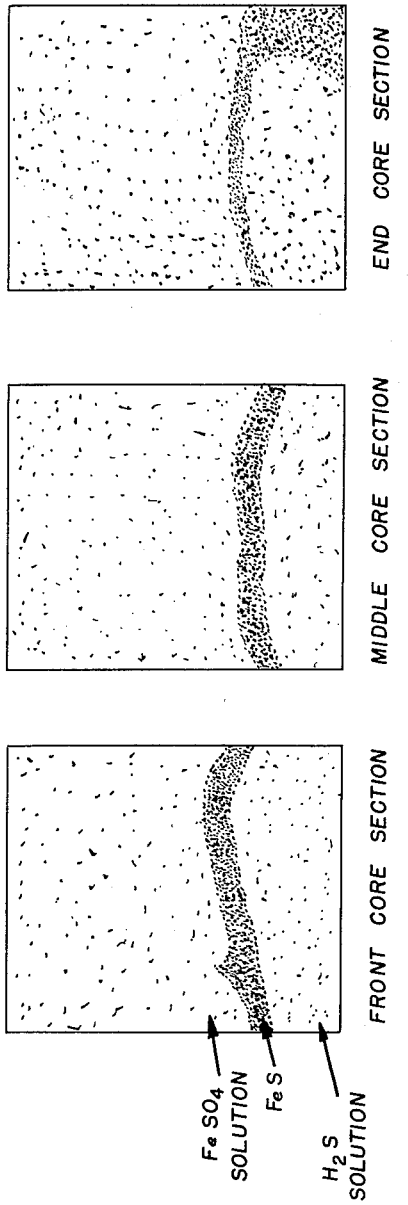
FIGURE 2 is a cross-sectional reproduction of core samples which have been treated in accordance with the instant invention.

In another experiment, a Berea sandstone core, 3.8 cms. and 5.1 cms. x 28 cms., having a permeability of about 147 millidarcies was mounted in a conventional permeameter. Using a specially designed gasket, the inlet face of the core was divided into two sections. A solution containing 0.3 g./l. of $FeSO_4$ was passed through one section, and a $H_2S$ solution having the following composition, in grams per liter: 10 NaCl, 3.3 $NaHCO_3$ and 3 $H_2S$, was simultaneously passed through the other section. In FIGURE 2 is shown a representation of the front, middle and end of the core. The black lines show where the two solutions met to form black FeS. Other than in the precipitate area the permeability of the core was not decreased.

In the preferred method of operation, a pair of fluid media adapted to form a precipitate upon contact with each other are employed. One medium is injected into one zone and the other medium is injected into the other zone. When the fluid media are injected in the following illustrative ways into formations having contiguous zones, each of which has a substantially uniform permeability but which vary in permeability relative to each other, an effective barrier to the by-passing of the drive fluid through the more permeable zone or zones of least resistance results:

(1) One of the media is pumped into the zone of higher permeability and injection is continued until solution break-through occurs in the producing well. Then the second media is pumped into the zone of lower permeability. By forming a layer of precipitate where these solutions come in contact, this second medium will be forced to sweep the zone of lesser permeability rather than follow the path of lesser resistance through the zone of high permeability. With this method it is essential that the first medium be injected into the zone of higher permeability.

(2) Both fluid media, such as those noted above, are pumped simultaneously into a dually completed well so that one medium is injected into the zone of higher permeability and the other medium is pumped into the zone of lower permeability. The fronts of the media in these zones will not move at the same rates (the front lagging in the zone of lower permeability), but by-passing into the zone of higher permeability will be prevented by the precipitate formed at the contact interfaces of the two fluid media. When the medium injected into the zone of higher permeability appears in the neighboring producing well, injection of the medium into this zone is stopped while injection of the second solution is continued into the zone of lower permeability. Concentration of the medium used can be selected on the basis of the amounts of precipitation which need be formed in the contact layer to avoid channeling through the zone of higher permeability.

The fluid media employed in carrying out the instant invention can be any combination of fluid substances which will interact with each other to form a precipitate. Although water is preferentially employed as the vehicle for containing the precipitate-forming substances, it is also possible to use other liquid solvents such as alcohol or other conventional organic compositions to prepare the incompatible combination of solutions. In addition, gaseous vehicles can also be employed. As a further ramification, substances which will per se interreact together, or with other substances in gaseous or liquid vehicles, can be employed in forming the precipitate barrier produced in accordance with the process of this invention. The following combinations are illustrative of the instant invention but are non-limiting with respect to the specific combinations that can be employed: aqueous solutions of calcium chloride and sodium sulfate; strontium chloride and sodium sulfate; ferrous bicarbonate and oxygen-containing water; ferrous or aluminum chloride and ammonia or a fixed alkali; calcium chloride and sodium carbonate; magnesium sulfate or chloride and an alkali, etc. Examples of gaseous vehicles are natural gases or refined tail gases which contain high concentrations of hydrogen sulfide. These gaseous mixtures can be interacted with aqueous solutions of ferrous bicarbonate or magnesium bicarbonate to produce the corresponding sulfide. Examples of substances which are reactable per se and do not have to be included in an appropriate vehicle include combinations of oxygen and hydrogen sulfide, and others. It is preferred, in carrying out this invention, that aqueous solutions of salts which will interact to form precipitates be employed.

The concentrations of the precipitate-forming elements of the fluid combination employed will be selected on the basis of the amount of precipitate which is to be formed in the contact layer to avoid channeling through the zone of higher permeability. In general, the fluid media should contain high concentrations of precipitate-forming constituents. The preferred concentrations can be determined experimentally. In employing mutually incompatible aqueous solutions, concentrations within the range of about 1% to 10% by weight will give satisfactory results. In some instances, solution concentrations as low as 0.01% can be used. Other formations, however, might require concentrations as high as 10%.

If gaseous media are employed in the precipitate-forming system, and this medium is not available in the undiluted form, the concentration of precipitant, such as hydrogen sulfide, oxygen, or the like, should be within the range of 100 to 100,000 p.p.m.

The amount of solution or element of the precipitatable combination injected into each stratum will depend upon a number of factors, such as permeability, extent of the formation, type of formation, the extent of the barrier to be produced, as well as other factors. In general, however, by passing 1 to 3 pore volumes of aqueous solution through each contiguous zone, a satisfactory precipitate barrier is built up at the permeability interface.

In injecting the element of the combination of the substances which will form the precipitate into its respective formation, conventional apparatus can be employed which will effect the separate introduction of the fluid media into the respective zones. Referring to FIGURE 1, a wellbore 10 has been drilled through a formation 11 having contiguous zones 11A and 11B, each of which has a substantially uniform permeability but which vary in permeability relative to each other. In bore hole 10 is installed well casing 12 with cement lining 13 positioned in the annular space between well casing 12 and the face of formation 11. The casing 12 and lining 13 are perforated in the conventional manner to provide access from well bore 10 into the formation 11 and the contiguous zones. Tubing 14 is positioned within casing 12 to a point adjacent lower zone 11B. A conventional well-packing device 15 is placed at the permeability interface to permit the separate introduction of each of the fluid media into its respective zone. Through tubing 12 is introduced one medium which flows into zone 11B while the second fluid medium is injected into zone 11A through casing 12. The incompatible media commingle at the permeability interface between the zones to form a precipitate barrier shown as a shaded area 16 in FIGURE 1.

Formations which are especially adaptable for being treated in accordance with the process of this invention are those geological formations having contiguous zones each of which has a substantially uniform permeability but which vary in permeability relative to each other. The permeability of these zones can be within the range of about 1 to 1000 millidarcies. In addition, uniformity in texture of the reservoir rock, and continuity and regularity of stratification, are important factors in treating rock reservoirs in accordance with this invention. These characteristics are generally found in reservoir rocks which are semi-consolidated sands, sandstones, conglomerates of limestone and sandstone consisting predominantly of the sandstone constituent, oolitic limestones, and other similar formations wherein, as it has been pointed out, the porous nature of the reservoir and the mechanics of displacement prevent the respective elements of the precipitate-forming combination from intimately admixing except at the interface between the injected precipitate-forming fluids.

It will be evident from the foregoing description of this invention that a number of modifications can be made without departing from the scope of the invention. Accordingly, it is intended that the subject invention be limited only in the manner specifically set forth in the following claims.

What is claimed is:

1. A process for substantially increasing the vertical fluid-flow resistance of a geological formation having a gas zone and a subjacent oil-bearing zone which comprises traversing said formation with a borehole, injecting a gaseous precipitant into said gas zone, and separately injecting a fluid medium into said oil-bearing zone, said gaseous precipitant and said fluid medium being such as to form an insoluble precipitate upon contact with each other under reservoir conditions, the amount of said gaseous precipitant and said fluid medium being sufficient to form a substantially fluid impermeable barrier of precipitate at the plane of contact between said gas zone and said oil-bearing zone without substantially decreasing the longitudinal permeability of said zones, and controlling the rates of injection of the gaseous precipitant and fluid medium so that the gaseous precipitant advances ahead of the fluid medium.

2. A process in accordance with claim 1 in which said gaseous precipitant is hydrogen sulfide.

3. A process in accordance with claim 2 in which said fluid medium is an aqueous salt solution reactable with said hydrogen sulfide to form a water-insoluble sulfide precipitate.

4. A process for substantially increasing the resistance to vertical fluid flow between contiguous strata in a geological formation comprising a first permeable stratum and a second more permeable stratum, each of said strata having a substantially uniform longitudinal permeability, which comprises traversing said formation with at least two boreholes, injecting through one borehole a first aqueous medium into said first stratum, and simultaneously therewith separately injecting through the same borehole a second aqueous medium into said second stratum, said aqueous media being such that upon commingling under reservoir conditions an insoluble precipitate is formed, and continuing injection of said media until breakthrough occurs at the other borehole.

5. A process in accordance with claim 4 wherein said first and second media comprise aqueous solutions of salts which will interact to form an insoluble precipitate, the concentrations of said salts being in the range of 0.01 to 10% by weight.

6. A process in accordance with claim 4 wherein an aqueous solution of ferrous sulfate and an aqueous solution of hydrogen sulfide are employed as said media.

7. A process for substantially increasing the resistance to vertical fluid flow in a geological formation between a first permeable stratum and a second, less permeable stratum contiguous therewith, each of said strata having a substantially uniform longitudinal permeability, which comprises traversing said formation with an injection borehole and an output borehole, disposing a well-packer means in said injection borehole whereby fluids can be separately injected into said strata, injecting a first fluid medium into said first stratum, continuing said injection until said fluid flows into said output borehole, and thereafter introducing a second fluid medium into said second, less permeable stratum, said second fluid media being such that upon commingling with said first fluid medium a precipitate is formed, the amount of said second fluid media being sufficient to form a band of substantially fluid impermeable precipitate at the interface between said first stratum and said second stratum without substantially decreasing the longitudinal permeability of said strata.

8. A process in accordance with claim 7 wherein said first and second fluid media comprise aqueous solutions of salts which will interact to form an insoluble precipitate, the concentrations of said salts being between 0.01 and 10% by weight.

9. A process in accordance with claim 7 wherein an aqueous solution of ferrous sulfate and an aqueous solution of hydrogen sulfide are employed as said fluid media.

10. A process for substantially increasing the vertical fluid-flow resistance of a formation having two contiguous strata differing from each other in permeability comprising traversing said strata with a borehole, injecting into one stratum a first fluid medium, separately injecting into the other stratum a second fluid medium which upon contact with said first medium under reservoir conditions forms an insoluble precipitate, controlling the rate of injection of said mediums so that the medium traversing the more permeable stratum advances ahead of said other medium, and injecting a sufficient amount of said media to form a substantially fluid impermeable precipitate barrier at the interface between said strata whereby fluid is prevented from flowing vertically from one stratum to the other without substantially decreasing the longitudinal permeability of said strata.

References Cited in the file of this patent
UNITED STATES PATENTS

| | | |
|---|---|---|
| 2,019,908 | Kennedy | Nov. 5, 1935 |
| 2,208,766 | Lawton | July 23, 1940 |
| 2,713,906 | Allen | July 26, 1955 |
| 2,837,163 | Ramos et al. | June 3, 1958 |